United States Patent [19]

Blackwell et al.

[11] Patent Number: 4,703,081

[45] Date of Patent: Oct. 27, 1987

[54] POLY(ARYLENE SULFIDE) RESIN TERNARY BLENDS

[75] Inventors: Jennings P. Blackwell; William H. Beever, both of Bartlesville, Okla.

[73] Assignee: Phillips Petroleum Company, Bartlesville, Okla.

[21] Appl. No.: 849,608

[22] Filed: Apr. 8, 1986

[51] Int. Cl.$^4$ .............................................. C08K 61/00
[52] U.S. Cl. ................................. 524/592; 525/420; 524/494; 524/496; 524/602; 524/609
[58] Field of Search ............... 525/420; 524/494, 496, 524/592, 602, 609

[56] References Cited

U.S. PATENT DOCUMENTS

| | | | |
|---|---|---|---|
| 3,321,449 | 5/1967 | Vogel | 260/79.3 |
| 4,021,596 | 5/1977 | Balley | 428/375 |
| 4,139,576 | 2/1979 | Takatsuki et al. | 260/857 |
| 4,232,142 | 11/1980 | Barr et al. | 528/125 |
| 4,340,697 | 7/1982 | Aya et al. | 525/420 |
| 4,361,693 | 11/1982 | Jansons | 528/86 |
| 4,415,729 | 11/1983 | Scoggins et al. | 528/388 |
| 4,544,700 | 10/1985 | Wright | 524/543 |

FOREIGN PATENT DOCUMENTS 0062830 10/1982 European Pat. Off. .
0161053 11/1985 European Pat. Off. .
0185317 6/1986 European Pat. Off. .

OTHER PUBLICATIONS

*Encyclopedia of Polymer Science & Technology*, vol. 11, pp. 269–272 (1969).
*Encyclopedia of Polymer Science & Technology*, vol. 11, pp. 447–463 (1969).
*Encyclopedia of Chemical Technology*, vol. 18, pp. 605–615 (1982).

*Primary Examiner*—Melvyn I. Marquis
*Attorney, Agent, or Firm*—French and Doescher

[57] ABSTRACT

A ternary polymer alloy containing a poly(arylene sulfide), a poly(amide imide), and at least one of a poly(aryl ketone) and a poly(aryl sulfone). The polymer alloy optionally can contain a fibrous reinforcing material such as a glass fiber.

13 Claims, No Drawings

POLY(ARYLENE SULFIDE) RESIN TERNARY BLENDS

FIELD OF THE INVENTION

The invention relates to poly(arylene sulfide) resin ternary blends. The invention further pertains to polymer (blends) containing a poly(arylene sulfide) resin, a poly(amide imide), and at least one of a poly(aryl ketone) and a poly(aryl sulfone). The invention also relates to such polymer alloys further containing fiber reinforcing materials.

BACKGROUND OF THE INVENTION

Poly(arylene sulfide) is a unique class of materials, produced commercially, that have found application in a variety of areas. Poly(arylene sulfide)s are resistant to most chemicals, have relatively high melting temperatures, and have good dimensional stability, as compared to other thermoplastics.

For certain some thermoplastic applications, alloys of two or more resins may exhibit a better balance of properties. For example, by admixing a resin having certain desirable physical properties with a second and/or third resin having other desirable physical properties it is hoped to find resin blends that have inherited at least some of the desired physical properties from each of the resins. Frequently, this has not been the case. But, the search has continued for blends (alloys) of improved properties.

It is an object of our invention to provide polymer alloys containing a poly(arylene sulfide)s and certain additional resins. It is also an object of our invention to desirably modify one or more physical properties, such as flexural strength, tensile strength, elongation, impact resistance, and heat distortion temperature, of the poly(arylene sulfide)s.

SUMMARY OF THE INVENTION

According to our invention, a polymer alloy is provided containing a poly(arylene sulfide), a poly(amide-imide), and at least one of a poly(aryl ketone) and a poly(aryl sulfone). Our invention further provides such polymer alloys containing a fiber reinforcing material. Various fillers and colorants also can be used. The polymer alloys are useful in preparing articles of manufacture since the blended resins exhibit desirable physical properties when compared to the individual resins.

DETAILED DESCRIPTION OF THE INVENTION

Poly(Arylene Sulfide)s

The poly(arylene sulfide)s resins include any polymeric material formed predominately by one or more aryl moieties having connecting sulfur linkages. Such polymers include those represented by the formula (—R—S—)$_n$ wherein R is a substituted or unsubstituted phenylene radical and n is at least 50. Suitable starting materials and preparative methods are disclosed in such as U.S. Pat. Nos. 3,354,129 and 3,919,177, the disclosures of which are hereby incorporated by reference.

Typically, a polyhalosubstituted aromatic compound is reacted with a sulfur source in a polar organic compound. In a commercial form of this process, paradichlorobenzene, optimally with a minor amount of a trichlorobenzene, is reacted with sodium sulfide in N-methyl-2-pyrrolidone, generally further in the presence of a small amount of an alkali metal carboxylate.

Suitable polyhalosubstituted aromatic compounds for producing poly(arylene sulfide) polymers and copolymers include 1,2-dichlorobenzene, 1,3-dichlorobenzene, 1,4-dichlorobenzene, 2,5-dichlorotoluene, 1,4-dibromobenzene, 2,5-dibromoaniline, 1,2,4-trichlorobenzene 1,3,5-trichlorobenzene, and the like, and mixtures thereof.

The poly(arylene sulfide)s can be a copolymer of two or more aromatic monomers. Referring to the general (—R—S—)$_n$ formula above, the predominate R group in a copolymer generally will be p-phenylene with, usually relatively minor amounts of, for example, aryl moieties such as

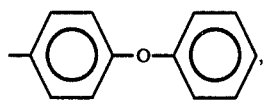

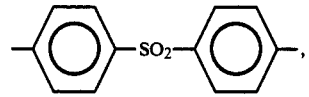

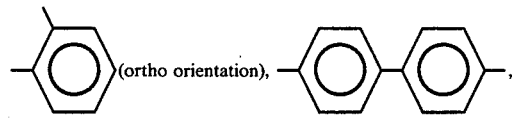

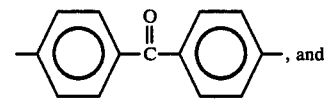

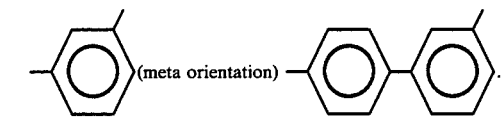

The preferred copolymers are those in which at least about 90 percent of the aromatic units are unsubstituted monoaromatic units. The linkages for the aromatic units also can include functionalities in addition to sulfide, for example

and/or —O—.

The presently preferred polymers in terms of availability and properties are poly(phenylene sulfide)s, which contain an unsubstituted benzene ring. Poly(phenylene sulfide) resins in general are thermoplastic polymers having a melting point in the range of about 280° to about 290° C., and are available as Ryton ® poly(phenylene sulfide)s in various forms as a product of Phillips Petroleum Company.

Poly(amide imide)s

The poly(amide imide) resins can be characterized by having both an amido radical and an imido radical in the repeating structure and can be represented by a repeating unit of the general formula:

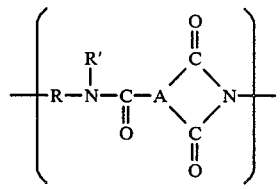

in which A represents a trivalent aromatic group containing at least one 6-membered carbon ring in which two carbonyl groups are bonded to adjacent carbon atoms of the benzene ring in the A group; R is a divalent aromatic or aliphatic residue; and R' is a hydrogen, methyl, or phenylene group.

Processes for preparing poly(amide imide) resins are disclosed in, for example, U.S. Pat. Nos. 3,661,832, 3,669,937, and 4,139,576, the disclosures of which are incorporated herein by reference. The poly(amide imide) resins can be prepared, for example, by reacting an excess diamine with diacid dichloride to form low-molecular weight amine-capped polyamide which is then reacted with pyromellitic dianhydride in dimethyl acetamide to form a poly(amide-(amide-acid)). The reaction mixtures are cast into poly((amide-acid)) film, which is subsequently converted to an aromatic poly(amide-imide) resin.

Another method for preparing the aromatic polyamide-imides involves the reaction of trimellitic anhydride derivatives, such as acid halide or acid ester, with a diamine. The poly(amide-(amide-acid)) is formed, which upon conversion, yields the poly(amide imide).

The preferred poly(amide-imide) resins are commercially available from Amoco Chemicals under the tradename, Torlon 4203E ®, which is represented by repeating units of the following molecular structure:

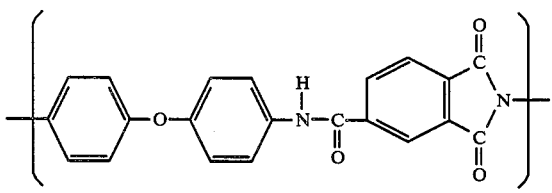

Poly(Aryl Ketone)s

Poly(aryl ketone)s suitable for use in our ternary blends can be shown by the following formula:

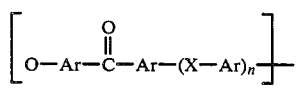

in which Ar is independently a divalent aromatic radical selected from phenylene, biphenylene, or naphthylene; X is independently O,

or a direct bond; and n is 0 or an integer of 1 to about 3.

Preferably, the poly(aryl ketone)s contain repeating units represented by the following formula:

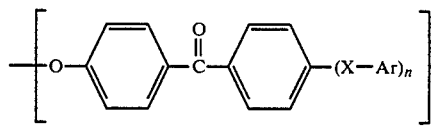

in which Ar, X, and n are as described above.

The most preferred poly(aryl ketone)s have repeating units of the formula:

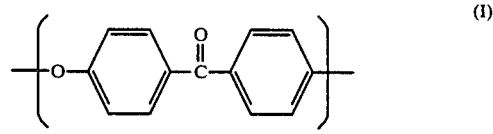

(I)

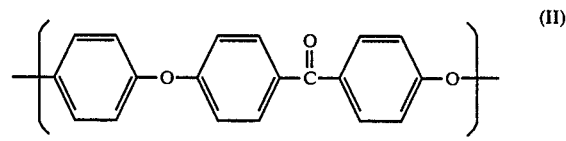

(II)

Poly(aryl ketone)s can be prepared by methods known in the art, such as by heating a substantially equimolar mixture of at least one bisphenol and at least one dihalobenzoid compound or at least one halophenol compound. The poly(aryl ketone)s can be prepared by processes as described in U.S. Pat. Nos. 4,176,222 and 3,953,400, the disclosures of which are hereby incorporated by reference.

Poly(Aryl Sulfone)s

The aromatic polysulfones are high molecular weight polymers containing sulfone groups and aromatic nuclei in the main polymer chain.

Poly(aryl sulfone)s suitable for use in our ternary blends can be represented by repeating units of the formula:

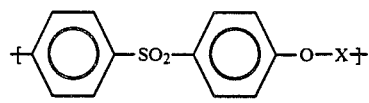

in which X is a substituted or non-substituted aryl group such as aryl ether, aryl sulfide, aryl ketone, or aryl sulfone. The poly(aryl sulfone)s are represented by aromatic rings linked alternately by ether and sulfone groups.

The poly(aryl sulfone)s can be prepared in a polymerization step wherein sulfone links are formed by the reaction of an aromatic sulfonyl chloride with a second aromatic ring. The development of sulfonylation as a polymerization process was accomplished by using catalytic amounts of certain halides, e.g., $FeCl_3$, $SbCl_5$, and $InCl_3$. A process for preparing poly(aryl sulfone)s is disclosed for example in U.S. Pat. No. 3,838,097, the disclosure of which is hereby incorporated by reference.

A preferred poly(aryl sulfone), in terms of its availability and properties, is polyether sulfone, such as sold by Imperial Chemical Industries Ltd., under the tradename Victrex ®, and which can be represented by repeating units:

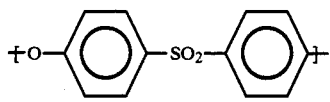

Another preferred aromatic polysulfone is prepared using 2,2-bis(4-hydroxy-phenyl)propane (Bisphenol A). Such an aromatic polysulfone, commercially available from Union Carbide Corp. under the tradenames Udel P-1700 ® and Udel P-3500 ®, can be represented by:

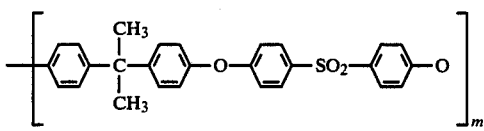

in which m has a value in the range of about 50 to 80.

Another suitable aromatic polysulfone that can be employed in our invention is the copolymeric polysulfone of the type described in U.S. Pat. No. 3,321,449, the disclosure of which is incorporated herein by reference. A copolymeric polysulfone is sold under the tradename, Astrel 360 ®, by the Minnesota Mining and Manufacturing Co. This copolymeric polysulfone is characterized as one containing biphenyl and phenyl units linked by oxygen or sulfone units.

Preparation

The blends (alloys) of our invention can be prepared using conventional techniques known in the art for producing such unitary masses from two or more resins. For example, the alloys can be formed by mixing suitable amounts or proportions of the dry powders or pellets of each of the resins by tumbling, followed by further mixing in a suitable polymer compounding device such as an extruder for melt extrusion. The mixing that takes place during conventional injection molding also will suffice to produce the alloys. Other known methods of forming alloys of resins which can be employed include for example melt mixing in a Banbury mixer. To form the alloys, the temperature has to be at least high enough that the resins employed melt, but the temperature should be kept sufficiently low to insure that none of the resins will be degraded. The resulting alloys can be granulated or pelletized if desired for convenience in handling for subsequent molding operations.

The amounts of each of the above-mentioned polymers in our polymer alloys can vary over a wide range, depending on desired properties. The ratios of the three or four polymer components in our alloys should be that which is effective to desirably modify one or more physical properties of the poly(arylene sulfide)s.

Generally, the polymer alloys will contain about 10 to 90 weight percent, preferably about 45 to 80 weight percent, most preferably about 45 to 50 weight percent poly(arylene sulfide, based on the weight of the blend composition excluding other compounding components such as fillers, colorants, and fibers.

The polymer alloys can contain a suggested range of about 5 to 50, preferably 10 to 40, weight percent of the poly(amide imide) resin, on the same basis.

The ternary blends can contain about 5 to 80 weight percent, preferably about 10 to 40 weight percent, of at least one of a poly(aryl ketone) and a poly(aryl sulfone), on the same basis.

It is realized that the total calculated percentages extend beyond 100, but that in practice the amounts of each component are readily proportioned to total 100, again excluding other compounding components.

Our alloy compositions optionally can include a reinforcing material such as glass or carbon fibers. When used, such materials generally will make up about 10 to 50 weight percent, preferably about 20 to 50 weight percent, and more preferably about 25 to 45 weight percent, based on the total weight of the polymers in the alloy compositions.

The alloy compositions optionally can include filler materials, such as calcium carbonate and calcium sulfate. Suitable amounts of filler vary widely, but generally will be from 0 to about 50 weight percent, preferably about 0.5 to 20 weight percent, based on the total weight of the polymers in the composition.

The blend compositions can contain additional optional components such as mold corrosion inhibitors, pigments, processing aids, and the like.

The compositions (alloys) are useful in preparing any articles of manufacture based on the poly(arylene sulfide) resins. The alloys are particularly useful where improved HDT (heat deflection temperature) properties are important.

EXAMPLES

Examples provided are intended to assist in a further understanding or our invention. Particular materials employed, species, conditions, are intended to be further illustrative of our invention and not limitative of the reasonable scope thereof.

The examples show that blends of poly(phenylene sulfide), poly ether ether ketone, and poly(amide imide) improve such properties as tensile strength and flexural strength when compared to an alloy containing poly(phenylene sulfide) and poly ether ether ketone.

Each poly(phenylene sulfide) polymer used in the examples was prepared according to the method of U.S. Pat. No. 4,038,262 by reacting dichlorobenzene and sodium sulfide in N-methyl-pyrrolidone containing 1,2,4-trichlorobenzene and sodium acetate, and recovering the product. The flow rate was determined in accordance with the procedure described in ASTM D 1238-70 at 316° C. (600° F.) using a 5 kg. weight and is reported in grams per 10 minutes. The poly(phenylene sulfide) employed is known under the trademark RYTON and was obtained from Phillips Petroleum Company.

EXAMPLE I

A series of homogeneous physical blends was prepared by mixing a poly(phenylene sulfide) (PPS) powder having a flow rate of 50, with poly ether ether ketone (PEEK) pellets having a melting point of 334° C., and polyether sulfone (PES) pellets having a specific gravity of 1.37. The PEEK was obtained from Imperial Chemical Industries. The PES was obtained from Imperial Chemical Industries under the trademark Victrex P300. Each polymer was dried for two hours at 150° C. in the presence of air. The appropriate weight of each polymer was placed in a plastic bag and the contents were thoroughly mixed. Each weighed blend of polymers was extruded at 349° C. (660° F.) from a Davis Standard 1½ inch extruder to form granules after chopping the extrudate. Test specimens of each blend were prepared by injection molding. The test specimens were annealed for two hours at 204° C. The results of physical tests on the annealed specimens are presented in Table I:

mark Udel P-1700 and having a melt viscosity at 350° C. of 5,600 poise, was blended with varying amounts of PPS the PPS and the PEEK as described in Example I. The results of the tests on the blends are presented in Table II:

TABLE I

| Run No. | 1 | 2 | 3 | 4 | 5 | 6 | 7 | 8 | 9 | 10 | 11 |
|---|---|---|---|---|---|---|---|---|---|---|---|
| PPS, Wt. % | 100 | 80 | 50 | 50 | 50 | 45 | 33.3 | 0 | 0 | 50 | 50 |
| PEEK, Wt. % | 0 | 10 | 40 | 35 | 25 | 10 | 33.3 | 100 | 0 | 50 | 0 |
| PES, Wt. % | 0 | 10 | 10 | 15 | 25 | 45 | 33.3 | 0 | 100 | 0 | 50 |
| Heat Distortion Temp, F.[a] | 117 | 143 | 165 | 165 | 185 | 201 | 177 | 164 | 201 | 154 | 212 |
| Flexural Modulus, MPa[b] | 3455 | 3523 | 3786 | 3650 | 3367 | 3336 | 3483 | 3499 | 2560 | 3748 | 3448 |
| Flexural Strength, MPa[c] | 148 | 127 | 165 | 164 | 162 | 160 | 140 | 164 | 130 | 166 | 77 |
| Tensile Strength Break, MPa[d] | 85.6 | 86.9 | 99.2 | 100.2 | 94.6 | 90.3 | 93.4 | 107 | 61.6 | 97.5 | 50.2 |
| Elongation, %[e] | 3.4 | 2.3 | 3.9 | 3.5 | 5.4 | 3.0 | 4.6 | 39.2 | 8.6 | 9.0 | 1.4 |
| Izod Impact, J/M[f] inch of notch | 44.2 | 45.4 | 32.5 | 30.9 | 50.0 | 48.0 | 47.6 | 61.2 | 93 | 44.8 | 25.5 |
| Izod Impact, no notch[g] J/M | 293 | 287 | 632 | 796 | 905 | 1013 | 548 | 3756 | 2966 | 1096 | 85.3 |

[a]Heat distortion temperature, D648.
[b]ASTM D790.
[c]ASTM D790.
[d]ASTM D638.
[e]ASTM D638.
[f]ASTM D256.
[g]ASTM D256.

The data in Table I show that the homogeneous ternary blends (Runs 2–7) have a higher heat distortion than the original PPS (Run 1). The data show that homogeneous ternary blends (Runs 3–7) have a higher heat distortion temperature than the original PEEK (Run 8) and the 50/50 weight percent of PPS and PEEK (Run 10). The heat distortion temperature of the ternary blends (Runs 2–7) increases as the percentage of PES in the ternary blends is increased.

The data show that the homogeneous ternary blends (Runs 3–6) have greater flexural strength than the original PPS (Run 1), original PES (Run 9), and a 50/50 weight percent of PPS and PES (Run 11). The data show that the homogeneous ternary blends (Runs 2, 3, 4 and 7) have greater flexural modulus than the original PPS (Run 1) and the 50/50 weight percent of PPS and PES. The data further show that the homogeneous ternary blends (Runs 2–7) have a greater flexural modulus than the original PES (Run 9).

The data show that ternary blends (Runs 2–7) have greater tensile strength than the original PPS (Run 1), original PES (Run 9), and a 50/50 weight percent of PPS and PES (Run 11). The data show that ternary blends (Runs 2, 5, 6 and 7) have greater Izod Impact values than original PPS (Run 1), a 50/50 weight percent of PPS and PEEK (Run 10), and a 50/50 weight percent of PPS and PES (Run 11).

EXAMPLE II

A polysulfone (PSO), which was commercially available from Union Carbide Company under the trade-

TABLE II

| Run No. | 1 | 8 | 10 | 12 | 13 | 14 | 15 | 16 |
|---|---|---|---|---|---|---|---|---|
| PPS, Wt. % | 100 | 0 | 50 | 50 | 50 | 50 | 0 | 50 |
| PEEK, Wt. % | 0 | 100 | 50 | 25 | 35 | 40 | 0 | 0 |
| PSO, Wt. % | 0 | 0 | 0 | 25 | 15 | 10 | 100 | 50 |
| Heat Distortion Temp, F. | 117 | 164 | 154 | 161 | 160 | 160 | 165 | 103 |
| Flexural Modulus, MPa | 3455 | 3499 | 3748 | 3593 | 3687 | 3620 | 2515 | 3373 |
| Flexural Strength, MPa | 148 | 164 | 166 | 152 | 160 | 160 | 115 | 143 |
| Tensile Strength Break, MPa | 85.6 | 107 | 97.5 | 89.1 | 91.9 | 94.3 | 65.8 | 86.3 |
| Elongation, % | 3.4 | 39.2 | 9.0 | 3.0 | 2.7 | 7.6 | 51.2 | 2.8 |
| Izod Impact, J/M inch of notch | 44.2 | 61.2 | 44.8 | 31.4 | 30.0 | 31.4 | 80 | 32.4 |
| Izod Impact, no notch J/M | 293 | 3756 | 1096 | 332 | 511 | 530 | 3672 | 655 |

The data in Table II show that the homogeneous ternary blends (Runs 12–14) have a higher heat distortion temperature than the original PPS (Runs 1) and the 50/50 blend of PPS and PSO (Run 16). In addition, the homogeneous ternary blends (Runs 12–14) exhibit a higher heat distortion temperature (HDT) than does a 50/50 blend of PPS and PEEK (Run 10). For example, the HDT value is 154° F. for Run 10 (a blend of 50% PPS and 50% PEEK), as compared to the HDT value of 161° F. for Run 12, (a blend of 50% PPS, 25% PEEK, and 25% PSO).

EXAMPLE III

A polyamide-imide (PAI), which was commercially available from Amoco Chemicals under the tradename Torlon 4203E ® and having Tg 275° C. and a processing temperature range 600°–675° F., was blended with varying amounts of the PPS and the PEEK as described in Example I. The results of the tests on the blends are presented in Table III.

TABLE III

| Run No. | 1 | 8 | 10 | 16 | 17 | 18 |
|---|---|---|---|---|---|---|
| PPS, Wt. % | 100 | 0 | 50 | 50 | 50 | 50 |
| PEEK, Wt. | 0 | 100 | 50 | 25 | 35 | 40 |
| PAI, Wt. % | 0 | 0 | 0 | 25 | 15 | 10 |
| Heat Distortion Temp, F. | 117 | 164 | 154 | 171 | 160 | 160 |
| Flexural Modulus, MPa | 3455 | 3499 | 3748 | 3917 | 3899 | 4047 |
| Flexural Strength, | 148 | 164 | 166 | 81.5; | 100 | 114 |

TABLE III-continued

| Run No. | 1 | 8 | 10 | 16 | 17 | 18 |
|---|---|---|---|---|---|---|
| MPa | | | | 76.4 | | |
| Tensile Strength Break, MPa | 85.6 | 107 | 97.5 | 39.0 | 68.9; 66.8 | 83.1; 74.4 |
| Elongation, % | 3.4 | 39.2 | 9.0 | 0.6 | 1.4 | 1.7 |
| Izod Impact, notched, J/M | 44.2 | 61.2 | 44.8 | 30.1 | 32.0 | 31.4 |
| Izod Impact, unnotched, J/M | 293 | 3756 | 1096 | 92.5 | 174 | 210 |

The data in Table III show that homogenous ternary blends (Runs 16–18) have a higher heat distortion temperature than the original PPS (Run 1) and blend of PPS and PEEK (Run 10). The data further show that homogenous ternary blends (Runs 16–18) have greater flexural modulus than the original PPS (Run 1), original PEEK (Run 8), and the blend of PPS and PEEK (Run 10).

The disclosure, including data, has illustrated the value and effectiveness of our invention. The examples, the knowledge and background of the field of the invention and the general principles of chemistry and of other applicable sciences have formed the bases from the the broad descriptions of our invention including the ranges of conditions and the generic groups of operant components have been developed, and formed the bases for our claims here appended.

We claim:
1. A polymer composition comprising:
   (a) a poly(arylene sulfide) resin present in an amount of about 10 to 90 weight percent based on the total weight of the polymer composition;
   (b) a poly(amide-imide) resin present in an amount of 10 to 40 weight percent based on the total weight of the polymer composition; and
   (c) at least one resin selected from the group consisting of a poly(aryl ketone) resin and a poly(aryl sulfone) resin present in an amount of about 5 to 80 weight percent based on the total weight of the polymer composition.
2. The composition of claim 1, wherein said (c) is a said poly(aryl ketone).
3. The composition of claim 2, employing about 45 to 80 weight percent said (a); 10 to 40 weight percent said (b); and about 10 to 40 weight percent said (c); such that the total of (a)+(b)+(c) is 100.
4. The polymer composition of claim 3, further comprising a fiber reinforcing material in an amount of about 20 to 50 weight percent, based on the weight of the resins present in the composition.
5. The composition of claim 3, wherein said (a) is poly(phenylene sulfide), and the poly(aryl ketone) has repeating units of the formula

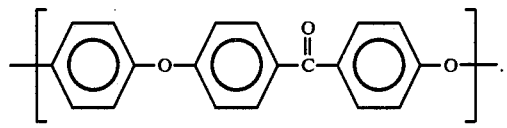

6. The polymer composition of claim 5, further including a fiber reinforcing material in an amount of about 20 to 50 weight percent, based on the weight of the resins in the composition.
7. The composition of claim 6, wherein the fiber reinforcing material is glass fibers or carbon fibers.
8. The composition of claim 1 wherein said (c) is said poly(aryl ketone) plus said poly(aryl sulfone).
9. The composition of claim 8, employing about 45 to 80 weight percent of said (a); 10 to 40 weight percent said (b); and about 10 to 40 weight percent of each of said poly(aryl ketone) and said poly(aryl sulfone), such that the total of all resin components is 100.
10. The composition of claim 9, further comprising a fiber reinforcing material in an amount of about 20 to 50 weight percent, based on the weight of the resins present in the composition.
11. The composition of claim 9, wherein said (a) is poly(phenylene sulfide), and said (c) is a poly(aryl ketone) having repeating unit of the formula

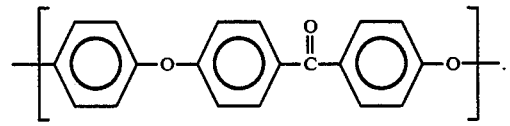

12. The composition of claim 11, further including a fiber reinforcing material in an amount of about 20 to 50 weight percent, based on the weight of the resins in the composition.
13. The composition of claim 12, wherein the fiber reinforcing material is glass fibers or carbon fibers.

* * * * *